(12) United States Patent
Abe et al.

(10) Patent No.: US 8,238,985 B2
(45) Date of Patent: Aug. 7, 2012

(54) INFORMATION PROCESSING APPARATUS

(75) Inventors: Yasuhiko Abe, Niiza (JP); Masataka Kato, Hachioji (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 1046 days.

(21) Appl. No.: 12/164,232

(22) Filed: Jun. 30, 2008

(65) Prior Publication Data

US 2009/0186669 A1    Jul. 23, 2009

(30) Foreign Application Priority Data

Jan. 21, 2008    (JP) ................ P2008-010342

(51) Int. Cl.
*H04W 88/02*    (2009.01)
*H04M 1/00*    (2006.01)

(52) U.S. Cl. .................................. 455/575.3
(58) Field of Classification Search ........... None
See application file for complete search history.

(56) References Cited

U.S. PATENT DOCUMENTS 6,196,670 B1    3/2001    Saruta
7,451,064 B2 *  11/2008   Hodge et al. ............ 702/187

FOREIGN PATENT DOCUMENTS

| JP | 2002-171324 A | 6/2002 |
|----|---------------|--------|
| JP | 2003-019815 A | 1/2003 |
| JP | 2003-289357 A | 10/2003 |
| JP | 2003-309629 A | 10/2003 |

OTHER PUBLICATIONS

Japan Office Action dated Nov. 22, 2011 as received in related application No. 2008-010342.
JP Office Action dated May 15, 2012 as received in related application No. 2008-010342.

* cited by examiner

*Primary Examiner* — Philip Sobutka
(74) *Attorney, Agent, or Firm* — Maschoff Gilmore & Israelsen (57) ABSTRACT

An information processing apparatus includes: a first casing; a second casing; a detecting portion that detects whether the first and the second casings are in a closed state or in a turnover open state; a volatile storage medium that stores a first number and a second number indicating the number of times of the closed state and the turnover open state respectively; and an accumulating portion that controls a nonvolatile storage medium to store the first number and the second number updated when the first number is dividable by a first predetermined number or when the second number is dividable by a second predetermined number.

12 Claims, 4 Drawing Sheets

INFORMATION PROCESSING APPARATUS

The entire disclosure of Japanese Patent Application No. 2008-010342 filed on Jan. 21, 2008 including specification, claims, drawings and abstract is incorporated herein by reference in its entirety.

BACKGROUND OF THE INVENTION

1. Field of the Invention

The invention relates to an information processing apparatus, particularly for storing the number of times of moving a mechanically movable portion of the apparatus.

2. Description of the Related Art

In an information processing apparatus having a mechanically movable portion, an extremely large number of times of moving the movable portion and the like may hinder a smooth movement of the movable portion. Also an electronic part installed along the movable portion such as a cable may be mechanically damaged. And as a result of the damage, an electric function may also be hindered. An example of the information processing apparatus is a mobile communication apparatus in which an upper casing and a lower casing are connected openably/closably by a hinge mechanism.

Hence, there is an apparatus which detects opening/closing of upper and lower casings, stores and updates the number of times of opening/closing carried out at each time of detecting opening/closing of the upper and lower casings, and displays the updated number of times of opening/closing by a certain operation (see JP-A-2003-309629 (page 2, FIG. 2, FIG. 4), for instance).

SUMMARY OF THE INVENTION

However, according to the method disclosed in the JP-A-2003-309629, there poses a problem that the number of times of opening/closing of the upper and lower casings is updated to be stored to a nonvolatile storage medium at each time of opening/closing.

The invention has been carried out in order to solve the problem and it has an object to provide an information processing apparatus reducing the number of times of storing the number of times of opening/closing of upper and lower casings in a nonvolatile storage medium.

According to one aspect of the invention, an information processing apparatus includes: a first casing having a first end portion; a second casing having a second end portion, hinged to the first end portion; a detecting portion that detects a state of the first and the second casings to output an opening/closing signal, the opening/closing signal indicating whether the first and the second casings are in a closed state or in a turnover open state, the closed state in which an inner face of the first casing faces an inner face of the second casing, the turnover open state in which an outer face of the first casing faces an outer face of the second casing; a volatile storage medium that stores a first number and a second number, the first number indicating the number of times of bringing the first and the second casings into the closed state, the second number indicating the number of times of bringing the first and the second casings into the turnover open state; a nonvolatile storage medium that stores a third number and a fourth number; and an accumulating portion that controls the volatile storage medium to increment the first number when the opening/closing signal indicates that the first and the second casings are in the closed state, and to increment the second number when the opening/closing signal indicates that the first and the second casings are in the turnover open state, wherein the accumulating portion controls the nonvolatile storage medium to update the third number and the fourth number by the first number and the second number respectively, when the first number is dividable by a first predetermined number or when the second number is dividable by a second predetermined number.

BRIEF DESCRIPTION OF THE DRAWINGS

Embodiment may be described in detail with reference to the accompanying drawings, in which.

DETAILED DESCRIPTION OF THE INVENTION

Figures 1A, 1B:
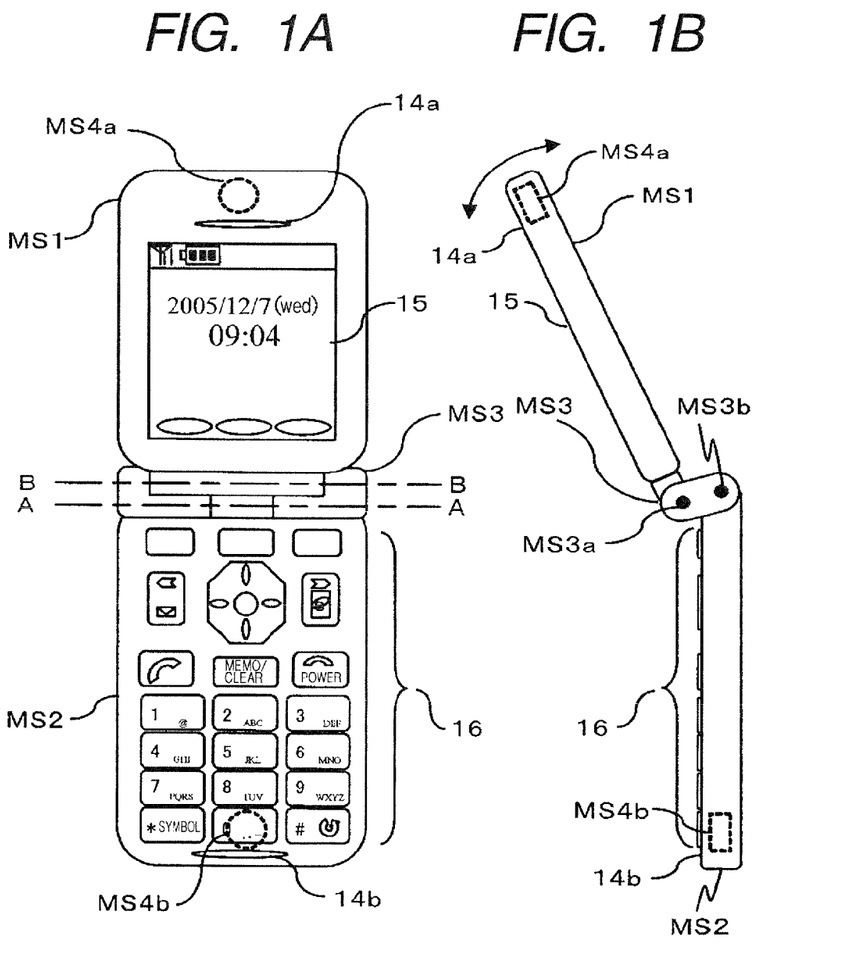
FIGS. 1A and 1B are outer appearance views when upper and lower casings of a mobile communication apparatus according to an embodiment of the invention is brought into a normal open state.

An embodiment of an information processing apparatus according to the invention will be explained in reference to the drawings as follows. FIGS. 1A and 1B show outer appearances when folding of upper and lower casings of a folding type mobile communication apparatus to which an information apparatus according to the embodiment of the invention is applied, FIG. 1A shows a front view and FIG. 1B shows a side view.

According to the mobile communication apparatus, a lower end portion of an upper casing MS1 and an upper end portion of lower casing MS2 are pivotably connected by way of two hinges of a first hinge MS3$a$ and a second hinge MS3$b$ included in a hinge portion MS3. Therefore, the upper casing MS1 and the lower casing MS2 are configured to be pivotable and openable/closable with an angle of the upper and lower casings MS1 and MS2 from substantially 0 degree (closed state) to substantially 360 degrees. When the upper and lower casings MS1 and MS2 are not brought into the closed state, the upper and lower casings MS1 and MS2 are brought into an open state. FIGS. 1A and 1B show outer appearances when the angle of the upper and lower casings MS1 and MS2 is opened substantially by 180 degrees, hereinafter, the open state is referred to as a normal open state.

An inner face of the upper casing MS1 is installed with a speaker 14$a$ used for receiving a call, and a display portion 15 of LCD (Liquid Crystal Display) attached with a backlight used for a display urging a user to operate, a display of a content operated by the user, a display of a cursor position or a state of operating the apparatus and the like. The display portion 15 is divided into a section for displaying a state of the apparatus by a simple picture (pict) and a section for carrying out a display depending on a content which is being processed. Hence, the inner face of the upper casing MS1 corresponds to a front face viewed from the user in the time of calling or viewing the display portion 15.

Further, an inner face of the lower casing MS2 is installed with a microphone 14b used for transmitting voice. Further, the inner face of the lower casing MS2 is provided with an input apparatus 16 having a key pad. Further, an inner portion of the lower casing MS2 is installed with an antenna used for transmitting and receiving a radio wave. Hence, the inner face of the lower casing MS2 configures a front face viewed from the user in time of calling or operating keys of the input apparatus 16.

When the upper and lower casings MS1 and MS2 are brought into the normal open state, the user can look at the display portion 15, and simultaneously, can operate the key of the input apparatus 16. Hence, the normal open state is suitable for a dialogue type processing, for example, a key input processing of a telephone number at the time of calling.

Further, in order to detect whether the upper and lower casings MS1 and MS2 are brought into the open state or the closed state, a first magnet MS4a is embedded at an upper portion (portion remote from the hinge portion MS3) of the upper casing MS1, a second magnet MS4b is embedded at a lower portion (portion remote from the hinge portion MS3) of the lower casing MS2. And the first magnet MS4a and the second magnet MS4b are arranged such that a distance between the first magnet MS4a and the second magnet MS4b is small when the upper and lower casings MS1 and MS2 are brought into the closed state.

Further, an opening/closing detecting portion (not shown) detects whether the upper and lower casings MS1 and MS2 are brought into the open state or the closed state by a magnetic force operated between the first magnet MS4a and the second magnet MS4b and outputs an opening/closing signal.

In the normal open state shown in FIGS. 1A and 1B, the distance between the first magnet MS4a and the second magnet MS4b is large, and therefore, the magnetic force operated between the first magnet MS4a and the second magnet MS4b is small and the opening/closing detecting portion detects that the apparatus is brought into the open state.

Figure 2A:
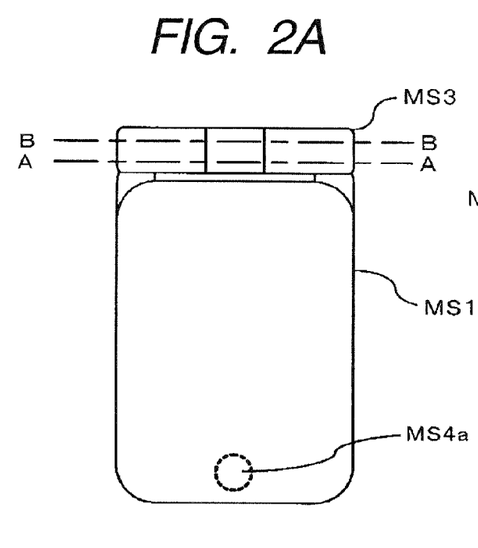
FIGS. 2A and 2B are outer appearance views when the upper and lower casings of the mobile communication apparatus according to the embodiment of the invention are brought into a closed state.
Figure 2B:
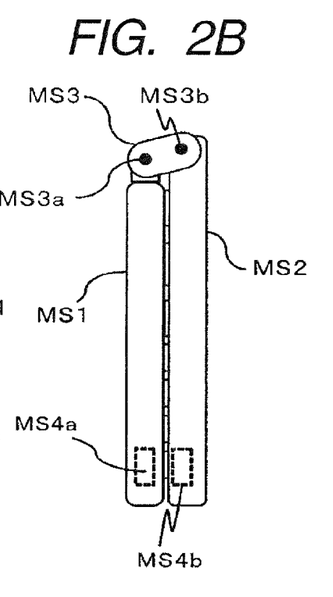

FIGS. 2A and 2B show outer appearances when the upper and lower casings MS1 and MS2 are brought into the closed state: that is, the upper and lower casings MS1 and MS2 are folded at the first hinge MS3a included in the hinge portion MS3 around an axis A-A so as to close the upper casing MS1 of the mobile communication apparatus in a direction in which the inner face of the upper casing MS1 and the inner face of the lower casing MS2 get closer to each other. FIG. 2A shows a front view and FIG. 2B shows a side view. When the upper and lower casings MS1 and MS2 are moved from the normal open state to the closed state, the upper casing MS1 is folded at the first hinge MS3a, not the second hinge MS3b.

In a folded and closed state, the inner face of the upper casing MS1 and the inner face of the lower casing MS2 are disposed on an inner side of the foldable structure. That is, the display portion 15 and the input apparatus 16 are disposed on the inner side of the foldable structure, and therefore, the user can neither look at the display portion 15 nor operate the key of the input apparatus 16. Hence, the closed state is suitable for a case in which the user does not use the apparatus (including a case in which the apparatus is brought into a standby state).

When the upper and lower casings MS1 and MS2 are brought into the closed state, the distance between the first magnet MS4a and the second magnet MS4b becomes small. And therefore, the opening/closing detecting portion detects that the apparatus is brought into closed state by the fact that the magnetic force between the first magnet MS4a and the second magnet MS4b becomes large.

Further, when the distance between the first magnet MS4a and the second magnet MS4b is smaller than a threshold distance, and therefore, the magnetic force acted between the first magnet MS4a and the second magnet MS4b is larger than a threshold intensity, the opening/closing detecting portion detects that the apparatus is brought into the closed state. That is, the state in which the angle between the upper and lower casings MS1 and MS2 is 0 degree is not necessary for the closed state.

Figure 3A:
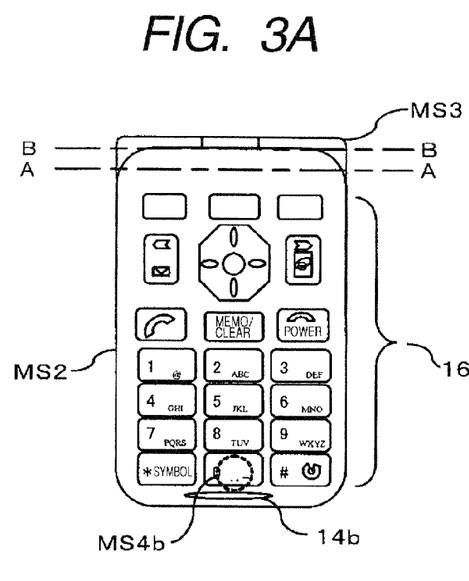
FIGS. 3A and 3B are outer appearance views when the upper and the lower casings of the mobile communication apparatus according to the embodiment of the invention is brought into a turnover open state.
Figure 3B:
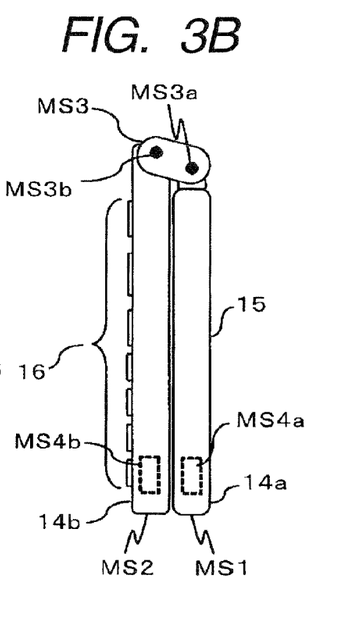

FIGS. 3A and 3B show outer appearances when the foldable structure is maximally opened by opening the upper casing MS1 at the hinge portion MS3 to bring the mobile communication apparatus into the normal open state shown in FIGS. 1A and 1B. The foldable structure is opened in a direction in which an outer face of the upper casing MS1 and an outer face of the lower casing MS2 get closer to each other by the second hinge MS3b included in the hinge portion MS3, that is, around an axis B-B. FIG. 3A shows a front view and FIG. 3B shows a side view.

In a state of maximally opening the foldable structure, the outer face of the upper casing MS1 and the outer face of the lower casing MS2 are disposed on the inner side. The state in which the apparatus were closed in a reverse direction is hereinafter referred to as a turnover open state. When the upper and lower casings MS1 and MS2 are moved from the normal open state to the turnover open state, the upper casing MS1 and the hinge portion MS3 are swung (in other words, the lower casing MS2 is swung) by the second hinge MS3b.

When the upper and lower casings MS1 and MS2 are brought into the turnover open state, the display portion 15 and the input apparatus 16 are disposed on the outer side of the foldable structure, and therefore, the user can look at the display portion 15 and can operate the key of the input apparatus 16.

However, as shown by FIG. 3B, one of the display portion 15 and the input apparatus 16 is arranged on a surface side and other thereof is arranged on a rear side, and therefore, the user cannot view simultaneously the display portion 15 and the input apparatus 16. Therefore, the turnover open state is suitable for a processing in which the user continues looking only at the display portion 15, for example, a processing of receiving a television broadcast mentioned later.

When the upper and lower casings MS1 and MS2 are brought into the turnover open state, the distance between the first magnet MS4a and the second magnet MS4b becomes small, and therefore, the opening/closing detecting portion detects that the apparatus is brought into the turnover open state by the fact that the magnetic force acted between the first magnet MS4a and the second magnet MS4b becomes large.

Further, when the distance between the first magnet MS4a and the second magnet MS4b is smaller than the threshold distance, and therefore, the magnetic force acted between the first magnet MS4a and the second magnet MS4b is larger than the threshold intensity, the opening/closing detecting portion detects that the apparatus is brought into the turnover open state. That is, the state in which the angle between the upper and lower casings MS1 and MS2 is 360 degrees is not necessary for the turnover open state.

Here, the magnetic force between the first magnet MS4a and the second magnet MS4b becomes large in either of when the upper and lower casings MS1 and MS2 are brought into the closed state and when the upper and lower casings MS1 and MS2 are brought into the turnover open state.

However, for example, according to the magnetic force between the first magnet MS4a and the second magnet MS4b, assuming that the first magnet MS4a and the second magnet MS4b are arranged in a direction of attracting each other, the attracting force is directed to the inner side when the upper and lower casings MS1 and MS2 are brought into the closed state, that is, the force received by the first magnet MS4a is directed to the face arranged with the display portion 15. On the other hand, the force is directed to the outer face when the upper and lower casings MS1 and MS2 are brought into the turnover closed state, that is, the force received by the first magnet MS4a is directed to the face which is not arranged with the display portion 15.

The same goes with the second magnet MS4b, when the upper and lower casings MS1 and MS2 are brought into the closed state, a force received by the second magnet MS4b is directed to the inner face, that is, the face arranged with the input apparatus 16. On the other hand, the force is directed to the outer face, that is, the face which is not arranged with the input apparatus 16 when the upper and lower casings MS1 and MS2 are brought into the turnover open state. In this way, the opening/closing detecting portion detects whether the upper and lower casings MS1 and MS2 are brought into the closed state or brought into the turnover open state by a direction of the force caused by the magnetic force between the first magnet MS4a and the second magnet MS4b.

Although in the above-described explanation, the opening/closing detecting portion detects whether the upper and lower casings MS1 and MS2 are brought into the closed state, or brought into the turnover open state by the magnetic force operated between the first magnet MS4a and the second magnet MS4b, the invention is not limited thereto. For example, a magnet for detecting whether the upper and lower casings MS1 and MS2 are brought into the closed state and a magnet for detecting whether the upper and lower casings MS1 and MS2 are brought into the turnover open state may be used.

Further, the opening/closing detecting portion may detect the angle made by the upper and lower casinos MS1 and MS2 by detecting an angle made by the upper casing MS1 and the hinge portion MS3 at the first hinge MS3a and detecting an angle made by the lower casing MS2 and the hinge portion MS3 at the second hinge MS3b. By detecting the angles made by the upper and lower casings MS1 and MS2, naturally, it can be detected whether the upper and lower casings MS1 and MS2 are brought into the closed state or brought into the turnover open state. Further, it can be detected whether the upper and lower casings MS1 and MS2 are brought into the normal open state.

Figure 4:
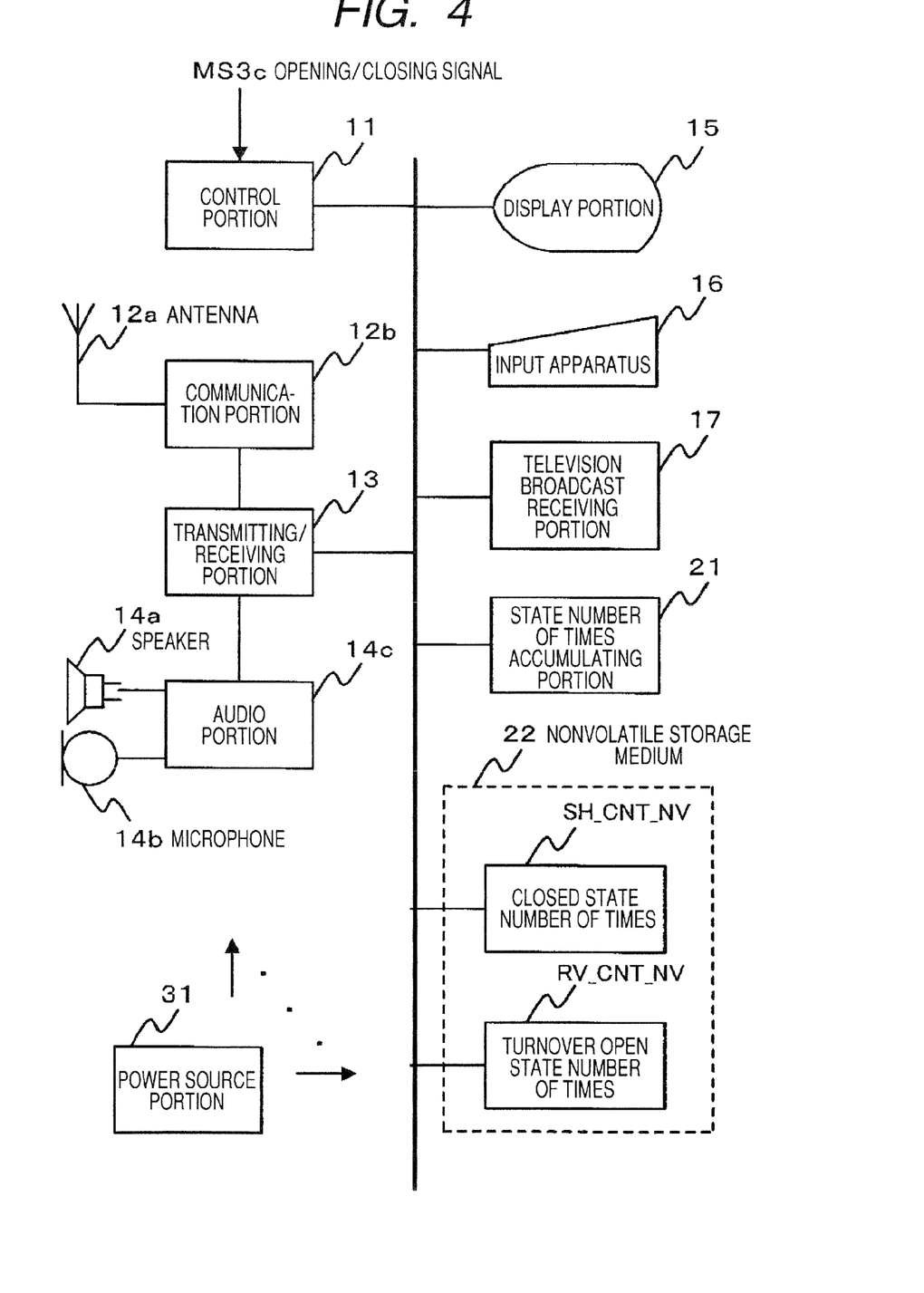
FIG. 4 is a block diagram showing a configuration of the mobile communication apparatus according to the embodiment of the invention.

FIG. 4 is a block diagram showing a configuration of the mobile communication apparatus according to the embodiment of the invention. The mobile communication apparatus is an apparatus of carrying out communication or the like by way of a mobile communication network (not shown), and includes a control portion 11 inputted with an opening/closing signal MS3c for controlling a total of the apparatus, an antenna 12a for transmitting and receiving a radio wave to and from a base station (not shown), a communication portion 12b, a transmitting/receiving portion 13, the speaker 14a, the microphone 14b, a audio portion 14c, the display portion 15, and the input apparatus 16.

Further, the mobile communication apparatus includes a television broadcast receiving portion 17, a state-number-of-times accumulating portion 21, and a nonvolatile storage medium 22, and a power source portion 31. The nonvolatile storage medium 22 is a secondary storage medium and configured by a NAND flash memory. The nonvolatile storage medium 22 is stored with a closed-state number of times (SH_CNT_NV) and a turnover-open-state number of times (RV_CNT_NV). The numbers of times are stored to the same page of the NAND flash memory. Here, a page is a unit of reading and writing stored information.

Here, the control portion 11 and the state-number-of-times accumulating portion 21 are configured with programs operated by utilizing a computer. In operating the program, a volatile primary storage medium (main memory, hereinafter, referred to as RAM) is used. Further, the control portion 11 is operated as an OS.

Operations of respective portions of the mobile communication apparatus according to the embodiment of the invention made as described above will be explained in reference to FIG. 4. First, the communication portion 12b outputs a high frequency signal received by the antenna 12a to the transmitting/receiving portion 13 and transmits the high frequency signal outputted from the transmitting/receiving portion 13 from the antenna 12a.

The transmitting/receiving portion 13 subjects the high frequency signal from the communication portion 12b to amplification, frequency conversion and demodulation and transmits a digital voice signal provided thereby to the audio portion 14c and transmits a control signal to the control portion 11. Further, a high frequency signal is provided by subjecting the digital voice signal outputted from the audio portion 14c and the control signal outputted from the control portion 11 to modulation, frequency conversion and amplification to transmit to the communication portion 12b.

Next, the audio portion 14c converts the digital voice signal outputted from the transmitting/receiving portion 13 into an analog signal to amplify to transmit to the speaker 14a. Further, the audio portion 14c amplifies an analog voice signal outputted from the microphone 14b to convert into a digital voice signal to transmit to the transmitting/receiving portion 13.

Next, an operation of the display portion 15 will be explained. When the display portion 15 can be viewed by a user, the display portion 15 carries out an operation of displaying character or numeral or image data by being controlled by the control portion 11, and the displayed data is switched by receiving an instruction from the control portion 11 in response to an input operation or incoming massage signal from the input apparatus 16.

The input apparatus 16 is provided with keys including numeral keys for designating a telephone number of a communication counter party and a plurality of function keys. Further, when the key of the input apparatus 16 is operated to input, the key input is received, an identifier of the key is informed to the control portion 11, and the key input is displayed as a character at the display portion 15 or an operation is carried out thereby by the control portion 11 and a processing portion receiving the identifier by way of the control portion 11.

The television broadcast receiving portion 17 receives a digital television broadcast and decodes coded broadcast contents including received image and voice. Further, the television broadcast receiving portion 17 makes the display portion 15 display a decoded image or makes a voice outputting speaker (not shown) output decoded voice.

The state-number-of-times accumulating portion 21 accumulates the number of times of bringing the upper and lower casings MS1 and MS2 into the closed state, that is, the number of times of the closed state, and the number of times of bringing the upper and lower casings MS1 and MS2 into the turnover open state, that is, the number of times of the turnover open state to be stored to the nonvolatile storage medium 22. Further, the state-number-of-times accumulating portion 21 reads the number of times of bringing the upper and lower casings MS1 and MS2 into the closed state and the number of times of bringing the upper and lower casings MS1 and MS2 into the turnover open state to display on the display portion 15 in accordance with a predetermined key operation of the input apparatus 16.

The nonvolatile storage medium 22 is the NAND flash memory for storing information. According to the NAND flash memory, erasure of stored information is carried out by a unit referred to as block. Here, a block includes a plurality of pages. There is a case in which when information is written repeatedly to a specific block, the block is deteriorated. Hence, in order to prevent the deterioration, when information is stored, the NAND flash memory stores the information to a block different from a block stored with information at a preceding time.

The power source portion 31 includes a storage battery and supplies power stored to the storage battery to respective portions of the apparatus. Further, when power of charging the storage battery is supplied from a charger (not shown), the storage battery is charged when the storage battery is not fully charged. On the other hand, when the storage battery is fully charged, the storage battery is not charged. Hence, charging is finished when the storage battery is fully charged.

An explanation will be given of an operation of accumulating the number of times of bringing the upper and lower casings MS1 and MS2 into the closed state and the number of times of bringing the upper and lower casings MS1 and MS2 into the turnover open state to store to the nonvolatile storage medium 22 in the mobile communication apparatus according to the embodiment of the invention configured as described above.

First, the closed-state number of times (SH_CNT_NV) stored to the nonvolatile storage medium 22 is a natural number equal to 0 or more indicating the number of times of bringing the upper and lower casings MS1 and MS2 into the closed state. The turnover-open-state number of times (RV_CNT_NV) stored to the nonvolatile storage medium 22 is a natural number equal to 0 or more indicating the number of times of bringing the upper and lower casings MS1 and MS2 into the turnover open state. As the number of times, 0 is stored at the time of manufacturing.

The control portion 11 grasps states of the upper and lower casings MS1 and MS2 by the opening/closing signal MS3c transmitted from the opening/closing detecting portion. That is, in accordance with requests of the respective portions, the control portion 11 makes the opening/closing detecting portion inform whether the upper and lower casings MS1 and MS2 are brought into the closed state, brought into the turnover open state, or a state other than the two states, and informs the provided notification to the respective requesting portions. Further, the control portion 11 informs the control portion 11 that the upper and lower casings MS1 and MS2 are changed into the closed state and that the upper and lower casings MS1 and MS2 are changed into the turnover open state by means of an interruption, by controlling the opening/closing detecting portion. The notification is made to include a state after the change.

When the interruption is occurred, the control portion 11 informs that the interruption is occurred and information included in the interruption to the state-number-of-times accumulating portion 21. Further, the control portion 11 informs a case of arrival of a certain time, a case of carrying out a key operation of the input apparatus 16 of turning off the power source of the apparatus, and a case of charging the storage battery by the power source portion 31 and finish charging because the storage battery is fully charged respectively to the state-number-of-times accumulating portion 21.

Further, the certain time is time after an elapse of a time period of a given time period multiplied by an integer (here, integer is a natural number equal to or larger than 1) since the power source has been inputted to the apparatus and arrival of the time is provided by a timer interruption of the control portion 11.

Figure 5:
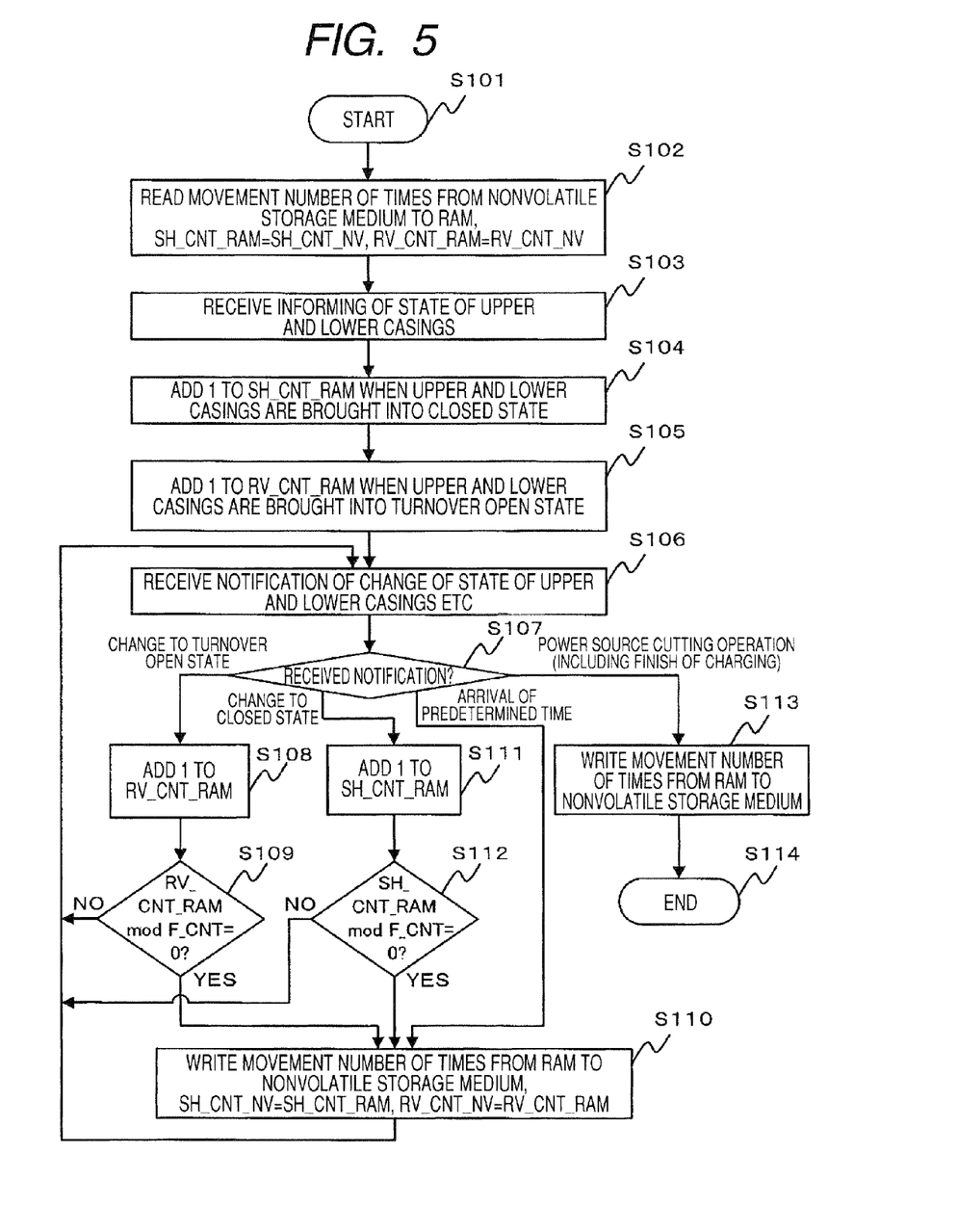
FIG. 5 is a flowchart of an operation of storing the number of times of bringing the upper and lower casings of the apparatus into the closed state and the number of times of bringing the upper and lower casings into the turnover open state in a nonvolatile storage medium according to the embodiment of the invention.

FIG. 5 shows a flowchart of an operation of updating to store the closed-state number of times (SH_CNT_NV) and the turnover-open-state number of times (RV_CNT_NV) stored to the nonvolatile storage medium 22 by the state-number-of-times accumulating portion 21. The state-number-of-times accumulating portion 21 is activated by the control portion 11 to start the operation when the power source is turned on and when charging of the storage battery is started by supplying power for charging the storage battery from a charger to the power source portion 31 while the power source of the apparatus is cut (step S101).

Further, the state-number-of-times accumulating portion 21 reads the closed-state number of times (SH_CNT_NV) and the turnover-open-state number of times (RV_CNT_NV) stored to the nonvolatile storage medium 22 to copy to RAM allocated to the state-number-of-times accumulating portion 21 to respectively configure the closed-state number of times (SH_CNT_RAM) and the turnover-open-state number of times (RV_CNT_RAM) stored to RAM (step S102).

Next, the state-number-of-times accumulating portion 21 requests the opening/closing detecting portion a notification of states of the upper and lower casings MS1 and MS2 through the control portion 11, and receives the notification (step S103). Then the state-number-of-times accumulating portion 21 adds 1 to the closed-state number of times (SH_CNT_RAM) stored to RAM when the received state is the closed state (step S104). On the other hand, when the state is the turnover open state, the state-number-of-times accumulating portion 21 adds 1 to the turnover-open-state number of times (RV_CNT_RAM) when the state is the turnover open state (step S105).

The reason of adding 1 thereto is for correctly accumulating the number of times of being brought into the closed state and the number of times of being brought into the turnover open state. That is, when the upper and lower casings MS1 and MS2 are brought into the closed state, the keys of the input apparatus 16 cannot be operated and the power source cannot be cut. Hence, because it is conceivable that when in cutting the power source, the upper and lower casings MS1 and MS2 are not brought into the closed state and the state received at step S103 is brought into the closed state, the upper and lower casings MS1 and MS2 are brought into the closed state when the state-number-of-times accumulating portion 21 is not operated.

On the other hand, when the upper and lower casings MS1 and MS2 are brought into the turnover open state, although the key of the input apparatus 16 can be operated, it cannot be viewed that the power source is cut simultaneously with the key operation by the display of the display portion 15. Hence, because it is conceivable that there is a high possibility that when in cutting the power source, the upper and lower casings MS1 and MS2 are not brought into the turnover open state and the state received at step S103 is the turnover open state, the upper and lower casings MS1 and MS2 are brought into the turnover open state while the state-number-of-times accumulating portion 21 is not operated after cutting the power source.

Next, the state-number-of-times accumulating portion 21 receives notification caused by the change of the states of the upper and lower casings MS1 and MS2 from the control portion 11 (step S106). When the notification is not received, reception thereof is awaited until receiving the notification. Further, operation is branched by the received notification (step S107).

When the received notification is that the upper and lower casings MS1 and MS2 are moved to the turnover open state, the state-number-of-times accumulating portion 21 adds 1 to the turnover-open-state number of times (RV_CNT_RAM) stored to RAM (step S108).

Further, when the numeral added with 1 becomes a numeral which cannot be stored as the turnover-open-state number of times (RV_CNT_RAM) stored to RAM, or when the number added with 1 becomes a numeral which cannot be stored as the turnover-open-state number of times (RV_CNT_NV) stored to the nonvolatile storage medium 22, the state-number-of-times accumulating portion 21 does not carry out the operation of step S108.

As a result, as is apparent by the following explanation, the operation of step S108 is not carried out to return to the operation of step S106. The case that the numeral cannot be stored is, for example, a case in which the numeral cannot be expressed by a bit number used for storing.

Next, the state-number-of-times accumulating portion 21 evaluates whether the turnover-open-state number of times (RV_CNT_RAM) stored to RAM is dividable by a flash number of times (F_CNT) corresponds to a positive natural number, that is, whether a remainder when the turnover-open-state number of times (RV_CNT_RAM) stored to RAM is divided by the flash number of times (F_CNT) is 0 (step S109).

In an undividable case as a result of evaluation ('NO' at step S109), the state-number-of-times accumulating portion 21 proceeds to the operation of receiving notification from the control portion 11 at step S106. In a dividable case ('YES' at step S109), the state-number-of-times accumulating portion 21 writes the closed-state number of times (SH_CNT_RAM) and the turnover-open-state number of times (RV_CNT_RAM) to the nonvolatile storage medium 22 (step S110).

That is, the closed-state number of times (SH_CNT_NV) stored to the nonvolatile storage medium 22 is updated to store by the closed-state number of times (SH_CNT_RAM) stored to RAM, and the turnover open-state number of times (RV_CNT_NV) stored to the nonvolatile storage medium 22 is updated to store by the turnover-open-state number of times (RV_CNT_RAM) stored to RAM to proceed to the operation of receiving notification from the control portion 11 of step S106.

Here, the number of times of writing to the nonvolatile storage medium 22 is reduced to achieve the effect of preventing deterioration of the nonvolatile storage medium 22 by carrying out the writing operation of step S110 when the turnover-open-state number of times (RV_CNT_RAM) stored to RAM is dividable by the flash number of times (F_CNT) stored to RAM at step S109.

Further, by updating to store not only the closed-state number of times (SH_CNT_NV) stored to the nonvolatile storage medium 22 but the turnover-open-state number of times (RV_CNT_NV) stored to the nonvolatile storage medium 22 at step S110, an effect of updating two of the number of times can be achieved by one-time-writing to the same page, that is, the same block of the nonvolatile storage medium 22.

On the other hand, when the received notification is that the upper and lower casings MS1 and MS2 are moved to the closed state at step S107, the state-number-of-times accumulating portion 21 adds 1 to the closed-state number of times (SH_CNT_RAM) stored to RAM (step S111).

Further, when the numeral added with 1 becomes the numeral which cannot be stored as the closed-state number of times (SH_CNT_RAM) stored to RAM, or when the numeral becomes the numeral which cannot be stored as the closed-state number of times (SH_CNT_NV) stored to the nonvolatile storage medium 22, the state-number-of-times accumulating portion 21 does not carry out the operation at the step S111. As a result, as is apparent from the following explanation, the operation of step S111 is not carried out to return to the operation of step S106.

Next, the state-number-of-times accumulating portion 21 evaluates whether the closed-state number of times (SH_CNT_RAM) stored to RAM is dividable by the flash number of times (F_CNT) that is, whether a remainder when the closed-state number of times (SH_CNT_RAM) stored to RAM is divided by the flash number of times (F_CNT) is 0 (step S112).

In an undividable case as a result of evaluation ('NO' at step S112), the state-number-of-times accumulating portion 21 proceeds to the operation of receiving notification from the control portion 11 at step S106. In a dividable case ('YES' at step S112), the state-number-of-times accumulating portion 21 proceeds to an operation of writing the closed-state number of times (SH_CNT_RAM) and the turnover-open-state number of times (RV_CNT_RAM) stored to RAM to the nonvolatile storage medium 22 at step S110

On the other hand, in a case in which the received notification is to notify an arrival of predetermined time at step S107, the state-number-of-times accumulating portion 21 writes the closed-state number of times (SH_CNT_RAM) and the turnover-open-state number of times (RV_CNT_RAM) stored to RAM to the nonvolatile storage medium 22 (step S110). Further, the state-number-of-times accumulating portion 21 proceeds to operation of receiving notification from the control portion 11 at step S106.

On the other hand, when the received notification is to notify a cutting-off of the power source of the apparatus and when the received notification notifies finishing to charge the storage battery at step S107, the state-number-of-times accumulating portion 21 writes the closed-state number of times (SH_CNT_RAM) and the turnover-open-state number of times (RV_CNT_RAM) stored to RAM to the nonvolatile storage medium 22 (step S113) and finishes the operation of updating to store the closed-state number of times (SH_CNT_NV) and the turnover-open-state number of times (RV_CNT_NV) stored to the nonvolatile storage medium 22 (step S114). Further, the operation at step S113 is the same as the operation at step S110 and a detailed explanation thereof will be omitted.

According to the operation of the state-number-of-times accumulating portion 21 explained above, the closed-state number of times (SH_CNT_NV) and the turnover-open-state number of times (RV_CNT_NV) stored to the nonvolatile storage medium 22 are not updated at each time of changing the upper and lower casings MS1 and MS2 into the closed state and changing the upper and lower casings MS1 and MS2 into the turnover open state, the number of times of writing to the nonvolatile storage medium 22 can be reduced to achieve an effect of preventing deterioration of the nonvolatile storage medium 22.

Particularly, the effect is significant when the closed-state number of times (SH_CNT_NV) and the turnover-open-state number of times (RV_CNT_NV) stored to the nonvolatile storage medium 22 are stored to a limited range of the nonvolatile storage medium 22 for storing information necessary for operating the system.

Further, there is an effect of reducing processing time and power consumption required for the writing. That is, a reduction in the number of times of writing is advantageous not only in a case in which the nonvolatile storage medium 22 is the NAND flash memory but all of cases in which the nonvolatile storage medium 22 is an NOR flash memory, and a magnetic disk apparatus and the like, so far as the nonvolatile storage medium 22 is the secondary storage medium.

In order to further enhance the effect, the number of times of writing to the nonvolatile storage medium 22 may further be reduced. For the further reduction, there are following methods. First, the flash number of times (F_CNT) is set at a large value. Further, the flash number of times (F_CNT) may use a value which differs by a value used at step S109 for evaluating the turnover-open-state number of times (RV_CNT_RAM) stored to RAM and a value used at step S112 for evaluating the closed-state number of times (SH_CNT_RAM) stored to RAM.

A reduction in the flash number of times (F_CNT) corresponds to frequent updating to store the number of times stored to the nonvolatile storage medium 22 to achieve an effect of reducing an error of the number of times stored to the nonvolatile storage medium 22 as described later. Further, an increase in the flash number of times (F_CNT) has an effect of reducing the writing number of times when it is permitted that the error included in the number of times stored to the nonvolatile storage medium 22 is permitted.

Hence, for example, when the number of times of swinging by the first hinge MS3a is further accurately grasped in order to investigate a hindrance brought about at the apparatus by swinging by the first hinge MS3a further in details, the flash number of times (F_CNT) used for evaluating the closed-state number of times (SH_CNT_RAM) stored to RAM at step S112 is set at a smaller value. Because as has been explained already, when the upper and lower casings MS1 and MS2 are brought into the closed state, although swinging by the first hinge MS3a is indispensable, in many cases, pivoting by the second hinge MS3b is not carried out.

On the other hand, when a hindrance brought about in the apparatus by swinging the second hinge MS3b is investigated further in details, the flash number of times (F_CNT) used at step S109 for evaluating the turn over-open-state number of times (RV_CNT_RAM) stored to RAM may be configured by a smaller value. Conversely, when it is not necessary to carry out a detailed investigation with regard to either of the hinges, it is apparently pertinent that a larger value is set as the flash number of times (F_CNT) for evaluating the number of times of bringing the upper and lower casings MS1 and MS2 into the open or closed state for which swinging of the hinge is indispensable.

Second, although in the above-described explanation, the state-number-of-times accumulating portion 21 writes the closed-state number of times (SH_CNT_RAM) and the turnover-open-state number of times (RV_CNT_RAM) stored to RAM to the nonvolatile storage medium 22 in three cases: a case in which the upper and lower casings MS1 and MS2 are moved to the turnover open state and the turnover-open-state number of times (RV_CNT_RAM) stored to RAM is dividable by the flash number of times (F_CNT); a case in which the upper and lower casings MS1 and MS2 are changed to the closed state and the closed-state number of times (SH_CNT_RAM) stored to RAM is dividable by the flash number of times (F_CNT); and a case of arrival of a certain time, the state-number-of-times accumulating portion 21 may write the number of times only in one or two cases of the three cases.

Third, instead of a case in which the turnover-open-state number of times (RV_CNT_RAM) stored to RAM is dividable by the flash number of times (F_CNT), in a case in which a difference configured by subtracting the turnover-open-state number of times (RV_CNT_RAM) stored to RAM at step S102 when the state-number-of-times accumulating portion 21 starts operating from the turnover-open-state number of times (RV_CNT_RAM) stored to RAM is dividable by the flash number of times (F_CNT), the operation of writing to the nonvolatile storage medium 22 at step S110 is carried out. The same processing can be carried out also for the closed-state number of times (SH_CNT_RAM) stored to RAM.

Fourth, instead of a case in which the turnover-open-state number of times (RV_CNT_RAM) stored to RAM and the closed-state number of times (SH_CNT_RAM) stored to RAM are respectively dividable by the flash number of times (F_CNT), in a case in which a sum of the two number of times is dividable by the flash number of times (F_CNT), the operation of writing to the nonvolatile storage medium 22 at step S110 is carried out.

According to the operation of the state-number-of-times accumulating portion 21 explained above, the closed-state number of times (SH_CNT_NV) and the turnover-open-state number of times (RV_CNT_NV) stored to the nonvolatile storage medium 22 are accurate although the number of times of moving the upper and lower casings MS1 and MS2 to the closed state in a case in which the power source of the apparatus is being cut and the storage battery is not charged by the power source portion 31 and the number of times of changing the upper and lower casings MS1 and MS2 to the turnover open state in that case are not included. Further, it is conceivable that the numbers of times which are not included are small.

However, there are brought about differences between the closed-state number of times (SH_CNT_NV) and the turnover-open-state number of times (RV_CNT_NV) stored to the nonvolatile storage medium 22 and the closed-state number of times (SH_CNT_RAM) and the turnover-open-state number of times (RV_CNT_RAM) stored to RAM when the operation of the apparatus is abnormally stopped, for example, the storage battery is removed from the apparatus by the user of the apparatus when the state-number-of-times accumulating portion 21 is being operated as described, and values accumulated with the differences corresponds to errors included respectively in the closed-state number of times (SH_CN_NV) and the turnover-open-state number of times (RV_CNT_NV) stored to the nonvolatile storage medium 22.

In order to reduce the errors, a processing reverse to the above-described processing achieving the effect in preventing the deterioration of the nonvolatile storage medium 22 may be carried out. Hence, there is a trade-off between a necessity of the above-described effect and an allowable error range.

In dealing with the trade-off, the following processing can be carried out. First, when the allowable error is not an error of number of times (for example, an error up to 100 times is allowable) but an error of a rate of the number of times (for example, an error up to 5% is allowable), the flash number of times (F_CNT) for evaluating the number of times at step S112 is calculated as a monotonous nonreducing function of the closed-state number of times (SH_CNT_RAM) stored to RAM. Further, a flash number of times (F_CNT) for evaluating the number of times at step S109 is calculated as a monotonous nonreducing function of the turnover-open-state number of times (RV_CNT_RAM) stored to RAM.

Or, a flash number of times (F_CNT) for evaluating the respective number of times is calculated as a monotonous nonreducing function of the closed-state number of times (SH_CNT_NV) and the turnover-open-state number of times (RV_CNT_NV) stored to the nonvolatile storage medium 22 read at step S102. In the case by the number of times read at step S102, in comparison with the case by the number of times stored to RAM, the number of times of calculating the flash number of times (F_CNT) can be reduced.

Here, the monotonous nonreducing function signifies that the flash number of times (F_CNT) is not reduced, that is, but the same value or a larger value as increasing the number of times. Further, according to the embodiment, a substantially linear function is pertinent as the monotonous nonreducing function, that is, it is pertinent that the flash number of times (F_CNT) is substantially proportional to the above-described number of times.

Second, a frequency of occurrences of abnormally stopping the operation of the apparatus is calculated, when the frequency is large, a small value is used as the flash number of times (F_CNT) and when the frequency is small, a large value is used as the flash number of times (F_CNT).

In the above-described explanation, the control portion 11, and therefore, the state-number-of-times accumulating portion 21 are notified of the states of the upper and lower casings MS1 and MS2 by requesting the opening/closing detecting portion and notified of the change in the states of the upper and lower casings MS1 and MS2 by interruption by the opening/closing detecting portion. However, the control portion 11 and the state-number-of-times accumulating portion 21 may be notified thereof by a request or notified thereof by interruption. The change of the upper and lower casings MS1 and MS2 may be detected not by interruption but by polling. All thereby is not a hindrance in the above-described operation.

In the above-described explanation, the state-number-of-times accumulating portion 21 does not evaluate the changed value at step S109 or step S112 respectively in a case in which the value of the closed-state-number of times (SH_CNT_RAM) stored to RAM is changed at step S104, or in a case in which a value of the turnover-open-state number of times (RV_CNT_RAM) stored to RAM is changed at step S105 and does not update to store the number of times stored to the nonvolatile storage medium 22 at step S110 regardless of whether the changed values is dividable by the flash number of times (F_CNT).

This is because the value is changed at step S104 or step S105 by only adding 1 and it is determined to be unnecessary to update to store the number of times stored to the nonvolatile storage medium 22. However, the invention is not limited thereto. The number of times stored to the nonvolatile storage medium 22 may be updated to store at step S110 when the changed value at step S109 or step S112 is evaluated and the changed value is dividable by the flash number of times (F_CNT).

Although in the above-described explanation, the state-number-of-times accumulating portion 21 starts operating by being started in a case in which the power source of the apparatus is cut and the power for charging the storage battery of the power source portion 31 is supplied from the charger to start charging the storage battery other than a case of inputting the power source of the apparatus, the invention is not limited thereto.

The state-number-of-times accumulating portion 21 may start operating by being started in a case in which the power for charging the storage battery is supplied from the charger to the power source portion 31 regardless of whether the storage battery is charged when the power source of the apparatus is cut. Because so far as the power is supplied from the charger, a reduction in the power amount stored to the storage battery by the power consumption by operating the state-number-of-times accumulating portion 21 may not be a hindrance in operating the apparatus.

In this way, in a case of supplying the power for charging the storage battery from the charger to the power source portion 31, when the state-number-of-times accumulating portion 21 starts operating by being started thereby, the state-number-of-times accumulating portion 21 can accumulate the closed-state number of times (SH_CNT_NV) and the turnover-open-state number of times (RV_CNT_NV) stored to the nonvolatile storage medium 22 when the power is supplied from the charger and the storage battery is fully charged. Further, when the storage battery is fully charged, it is possible that the user of the apparatus disconnect the apparatus from the charger. The disconnection is included in a case of abnormally stopping to operate the apparatus. However, the state-number-of-times accumulating portion 21 can carry out the operation of step S113 when the disconnection is dealt with the operation of cutting the power source.

Although in the above described explanation, the state-number-of-times accumulating portion 21 is operated over a time period during which the power source of the apparatus is inputted and is cut and a time period during which charging of the stored battery is started and finished, the invention is not limited thereto. Step S102 through step S105 and step S107 through step S113 may be processed separately. That is, the former is operated and finished as so-to-speak preparatory stage of a case of inputting the power source of the apparatus and a case of starting to charge the storage battery. The latter may be started by the control portion 11 when notification from the control portion 11 described in the explanation of step S106 is carried out and finished after the operation to the notification.

Although in the above-described explanation, the number of times of bringing the upper and lower casings MS1 and MS2 into the closed state and the number of times of bringing the upper and lower casings MS1 and MS2 into the turnover open state are stored, the invention is not limited thereto. The number of times of bringing the upper and lower casings MS1 and MS2 into the normal open state may be stored.

Although in the above-described explanation, the number of times of bringing the upper and lower casings MS1 and MS2 into the closed state and the turnover open state by pivotally moving are stored, the invention is not limited thereto. The invention is applicable to a case of storing the number of times of bringing the upper and lower casings MS1 and MS2 into the closed state and an open state by being slid.

Although the above-described explanation is carried out by using the example of applying the invention to the mobile communication apparatus, the invention is applicable to all of information processing apparatuses having a mechanically movable portion. Further, the invention is riot limited to a processing of storing the number of times of moving a mechanically movable portion but is applicable to all of processing of storing the number of times of operation.

It is to be understood that the invention is not limited to the specific embodiment described above and that the invention can be embodied with the components modified without departing from the spirit and scope of the invention. The invention can be embodied in various forms according to appropriate combinations of the components disclosed in the embodiment described above. For example, some components may be deleted from the configurations as described as the embodiments. Further, the components in different embodiments may be used appropriately in combination.

What is claimed is:

1. An information processing apparatus, comprising:
a first casing having a first end portion;
a second casing having a second end portion, hinged to the first end portion;

a detecting portion configured to detect a state of the first and the second casings to output an opening/closing signal, the opening/closing signal indicating whether the first and the second casings are in a closed state or in a turnover open state, the closed state in which an inner face of the first casing faces an inner face of the second casing, the turnover open state in which an outer face of the first casing faces an outer face of the second casing;

a volatile storage medium configured to store a first number and a second number, the first number indicating the number of times of bringing the first and the second casings into the closed state, the second number indicating the number of times of bringing the first and the second casings into the turnover open state;

a nonvolatile storage medium configured to store a third number and a fourth number; and an accumulating portion configured to control the volatile storage medium to increment the first number when the opening/closing signal indicates that the first and the second casings are in the closed state, and to increment the second number when the opening/closing signal indicates that the first and the second casings are in the turnover open state, wherein the accumulating portion controls the nonvolatile storage medium to update the third number and the fourth number by the first number and the second number respectively, when the first number is dividable by a first predetermined number or when the second number is dividable by a second predetermined number.

2. The apparatus of claim 1, wherein the accumulating portion calculates at least one of the first predetermined number and the second predetermined number, the first predetermined number as a monotonous nonreducing function of at least one of the first number and the third number, the second predetermined number as a monotonous nonreducing function of at least one of the second number and the fourth number.

3. The apparatus of claim 1, wherein the nonvolatile storage medium includes a flash memory.

4. The apparatus of claim 2, wherein the nonvolatile storage medium includes a flash memory.

5. The apparatus of claim 1, wherein the nonvolatile storage medium includes a NAND flash memory.

6. The apparatus of claim 2, wherein the nonvolatile storage medium includes a NAND flash memory.

7. An information processing apparatus, comprising:

a first casing having a first end portion;

a second casing having a second end portion, hinged to the first end portion;

a detecting portion configured to detect a state of the first and the second casings to output an opening/closing signal, the opening/closing signal indicating whether the first and the second casings are in a closed state or in a turnover open state, the closed state in which an inner face of the first casing faces an inner face of the second casing, the turnover open state in which an outer face of the first casing faces an outer face of the second casing;

a volatile storage medium configured to store a first number and a second number, the first number indicating the number of times of bringing the first and the second casings into the closed state, the second number indicating the number of times of bringing the first and the second casings into the turnover open state;

a nonvolatile storage medium configured to store a third number and a fourth number; and an accumulating portion configured to control the volatile storage medium to increment the first number when the opening/closing signal indicates that the first and the second casings are in the closed state, and to increment the second number when the opening/closing signal indicates that the first and the second casings are in the turnover open state, wherein the accumulating portion controls the nonvolatile storage medium to update the third number and the fourth number by the first number and the second number respectively, when a sum of the first number and the second number is dividable by a predetermined number.

8. The apparatus of claim 7, wherein the accumulating portion calculates the predetermined number as a monotonous nonreducing function of at least one of a sum of the third number and the fourth number, and the sum of the first number and the second number.

9. The apparatus of claim 7, wherein the nonvolatile storage medium includes a flash memory.

10. The apparatus of claim 8, wherein the nonvolatile storage medium includes a flash memory.

11. The apparatus of claim 7, wherein the nonvolatile storage medium includes a NAND flash memory.

12. The apparatus of claim 8, wherein the nonvolatile storage medium includes a NAND flash memory.

* * * * *